(12) United States Patent
Sawada

(10) Patent No.: US 9,387,748 B2
(45) Date of Patent: Jul. 12, 2016

(54) ROLL SHADE APPARATUS FOR VEHICLE

(71) Applicant: AISIN SEIKI KABUSHIKI KAISHA, Kariya-shi, Aichi-ken (JP)

(72) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/772,175

(22) PCT Filed: Sep. 27, 2013

(86) PCT No.: PCT/JP2013/076226
§ 371 (c)(1),
(2) Date: Sep. 2, 2015

(87) PCT Pub. No.: WO2014/155785
PCT Pub. Date: Oct. 2, 2014

(65) Prior Publication Data
US 2016/0009165 A1   Jan. 14, 2016

(30) Foreign Application Priority Data
Mar. 26, 2013   (JP) .................................. 2013-064338

(51) Int. Cl.
*B60J 1/20*   (2006.01)
*B60J 7/00*   (2006.01)

(52) U.S. Cl.
CPC ..................................... *B60J 7/0015* (2013.01)

(58) Field of Classification Search
CPC ..................................................... B60J 7/0015
USPC .............. 160/370.22, 31, 266; 296/98, 37.16, 296/214, 143, 142
See application file for complete search history.

(56) References Cited

U.S. PATENT DOCUMENTS

| 1,309,488 | A | * | 7/1919 | Richardson | ............. E06B 9/581 160/23.1 |
| 4,978,165 | A | * | 12/1990 | Schreiter | .................. B60J 7/057 296/208 |
| 5,133,585 | A | * | 7/1992 | Hassan | ...................... B60J 3/02 160/370.22 |
| 5,947,544 | A | | 9/1999 | Hubeshi | |
| 6,179,373 | B1 | | 1/2001 | Bohm et al. | |

(Continued)

FOREIGN PATENT DOCUMENTS

| DE | 10 2005 056 331 B3 | 5/2007 |
| EP | 1 426 219 B1 | 6/2004 |

(Continued)

*Primary Examiner* — Dennis H Pedder
(74) *Attorney, Agent, or Firm* — Finnegan, Henderson, Farabow, Garrett & Dunner, LLP

(57) ABSTRACT

A roll shade apparatus for a vehicle is provided with a light shielding sheet, a winding member for the light shielding sheet, and a pair of sliding portions guiding the light shielding sheet. The roll shade apparatus for the vehicle is further provided with a first contact portion arranged between the sliding portions and the winding member, and a second contact portion arranged between the sliding portions and the first contact portion. The first contact portion is in contact with an upper surface of the light shielding sheet at a first intermediate position between an upper-most position of the winding member and a lower-most position of the winding member. The second contact portion is in contact with a lower surface of the light shielding sheet at a second intermediate position. The second intermediate position is positioned equivalent to or higher than the first contact portion.

5 Claims, 4 Drawing Sheets

(56) References Cited

U.S. PATENT DOCUMENTS

| | | | |
|---|---|---|---|
| 8,366,187 B2 * | 2/2013 | Mihashi | B60J 7/0435 296/214 |
| 2004/0112549 A1 | 6/2004 | Biewer | |
| 2005/0225122 A1 | 10/2005 | Becher et al. | |
| 2005/0225123 A1 | 10/2005 | Grimm et al. | |
| 2009/0108635 A1 | 4/2009 | Wingen | |

FOREIGN PATENT DOCUMENTS

| | | |
|---|---|---|
| EP | 1 584 509 A2 | 10/2005 |
| FR | 2 969 538 | 6/2012 |
| JP | 63-258213 | 10/1988 |
| JP | 2008-544891 | 12/2008 |

* cited by examiner

Vehicle width direction

Vehicle inner side ⟵⟶ Vehicle outer side

FIG.7                Prior Art

ROLL SHADE APPARATUS FOR VEHICLE

CROSS-REFERENCE TO RELATED APPLICATIONS

This application is a national phase application of International Application No. PCT/JP2013/076226, filed Sep. 27, 2013, and claims the priority of Japanese Application No. 2013-064338, filed Mar. 26, 2013, the content of both of which is incorporated herein by reference.

TECHNICAL FIELD

The technique of the present disclosure relates to a roll shade apparatus for a vehicle, which winds up a light shielding sheet in a direction which allows passage of light at a light transmission portion provided at a roof portion of a vehicle and winds out the light shielding sheet in a direction which blocks the passage of the light.

BACKGROUND ART

Such a roll shade apparatus for a vehicle is described in Patent document 1, for example. As illustrated in FIG. 7, the roll shade apparatus for the vehicle is provided with a holding member 91 formed at a roof portion of a vehicle to extend in a vehicle width direction (a direction which is orthogonal to the paper surface in FIG. 7) and including a substantially U-shaped groove configuration, a winding member 92 supported around an axis line extending in the vehicle width direction inside the holding member 91, and a light shielding sheet 93. One edge portion of the light shielding sheet 93 is fixed to the winding member 92 in a manner that the light shielding sheet 93 can be wound up and wound out. A sliding member (not shown) for the light shielding sheet 93 is provided at the roof portion. A substantially bow-shaped contact portion 91a is formed at an upper edge portion of the holding member 91. The contact portion 91a guides the movement of the light shielding sheet 93 between the contact portion 91a and the sliding portion. A lower surface of the light shielding sheet 93 wound up and wound out relative to the winding member 92 is in contact with the contact portion 91a. Thus, tension of the light shielding sheet 93 is increased, and accordingly a wrinkle is prevented from occurring at the light shielding sheet 93. In the Patent document 1, it is also disclosed that two of the light shielding sheets 93 which are layered on each other are wound around the single winding member 92 and these shielding sheets 93 are wound up and wound out at the same time in a vehicle front direction and in a vehicle rear direction with the winding member 92 disposed therebetween.

DOCUMENT OF KNOWN ART

Patent Document

Patent document 1: European patent EP 1426219B1 Description

OVERVIEW OF INVENTION

Problem to be Solved by Invention

However, according to Patent document 1, in order to increase tension of the light shielding sheet 93 with the use of the contact portion 91a, a position H91 in a vehicle height direction of an outer peripheral surface of the light shielding sheet 93 wound up in a rolled state by the winding member 92 needs to be positioned to be equivalent to or lower than a position 1192 of the contact portion 91a in the vehicle height direction. In this case, generally, the lower the position H91 is positioned than the position H92 of the contact portion 91a, more the tension of the light shielding sheet 93 is increased. Accordingly, in a case where an outer diameter (a roll diameter) of the light shielding sheet 93 that has been wound up in the rolled state by the winding member 92 is decreased as the light shielding sheet 93 is wound out, the position H91 moves up, and thus the tension of the light shielding sheet 93 is loosened and the wrinkle may be easily generated at the light shielding sheet 93.

A purpose of the present disclosure is to provide a roll shade apparatus for a vehicle which can prevent a wrinkle from occurring at a light shielding sheet regardless of a state of winding up and winding out of the light shielding sheet relative to a winding member.

Means for Solving Problem

A roll shade apparatus for a vehicle hr achieving the aforementioned problems includes a light shielding sheet, a winding member to which one edge portion of the light shielding sheet in an operation direction thereof is fixed, the winding member being capable of winding up and winding out the light shielding sheet to allow and block passage of light at a light transmission portion provided at a roof portion of a vehicle, and a pair of sliding portions each provided at the roof portion to extend in the operation direction, the sliding portions guiding both vehicle width direction edge portions of the light shielding sheet in the operation direction. The roll shade apparatus for the vehicle further includes a first contact portion arranged between the both sliding portions and the winding member in the operation direction. The first contact portion is in contact with an upper surface of the light shielding sheet wound up and wound out by the winding member at a first intermediate position between an upper-most position of the winding member and a lower-most position of the winding member in a vehicle height direction. The roll shade apparatus for the vehicle further includes a second contact portion arranged between the both sliding portions and the first contact portion in the operation direction. The second contact portion is in contact with a lower surface of the light shielding sheet at a second intermediate position between the upper-most position of the winding member and the lower-most position of the winding member in the vehicle height direction and guides the both vehicle width direction edge portions of the light shielding sheet to the both sliding portions, respectively. The second intermediate position is positioned equivalent to or higher than the first contact portion in the vehicle height direction.

BRIEF DESCRIPTION OF DRAWINGS

FIG. 7 Schematic view illustrating a conventional form

MODE FOR CARRYING OUT INVENTION

An embodiment of a roll shade apparatus for a vehicle will be described. In the following description, a vehicle front/rear direction is referred to as "a front/rear direction", and an upper side in a vehicle height direction and a lower side in the vehicle height direction are referred to as "an upper side" and "a lower side", respectively. In a vehicle width direction, a side towards an inside of a vehicle cabin is referred to as "a vehicle inner side" and a side towards an outside of the vehicle cabin is referred to as "a vehicle outer side".

Figure 1:
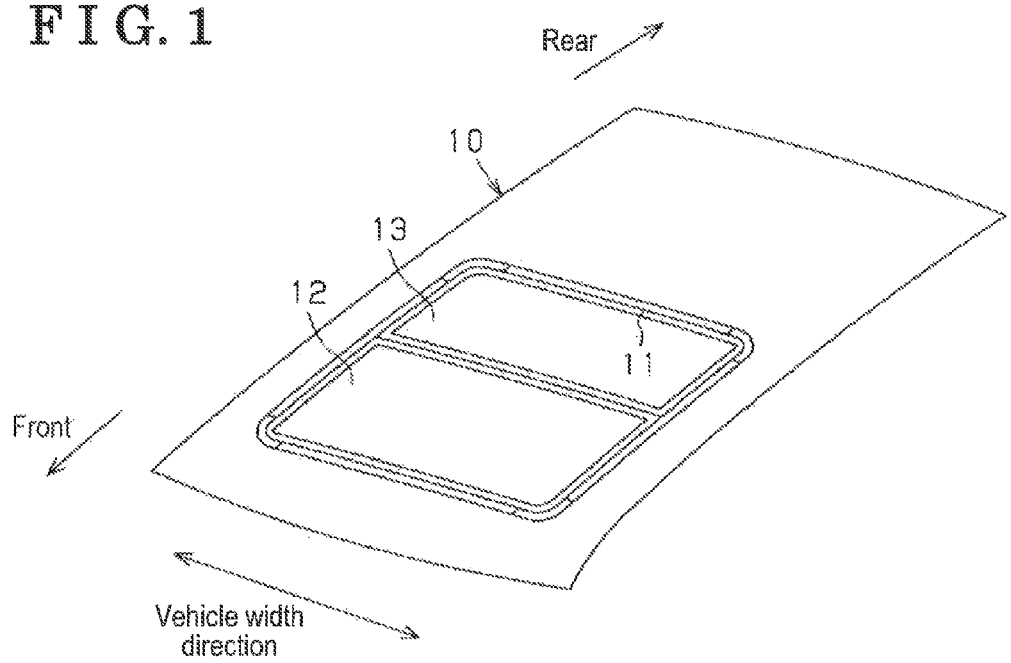
FIG. 1 Perspective view of a roof of a vehicle on which a roll shade apparatus for a vehicle according to an embodiment is mounted, which is seen from an obliquely upward direction FIG. 2 Plan view schematically illustrating the roll shade apparatus for the vehicle according to the embodiment FIG. 3 Cross-sectional view taken along line 3-3 of FIG. 2

As illustrated in FIG. 1, at a roof portion 10 of a vehicle including an automobile, an opening portion 11 including a substantially rectangular shape is formed. In addition, a movable panel 12 and a fixed panel 13 which serve as a light transmission portion, are made of glass or resin, and include in a substantially rectangular shape are provided at the roof portion 10. The movable panel 12 is mounted on the opening portion 11 so that the movable panel 12 can open and close a front portion of the opening portion 11 in an electrically driven manner. That is, the movable panel 12 is mounted on the opening portion 11 to be able to perform a tilt up movement in which a rear side portion of the movable panel 12 moves up relative to a front side portion thereof while the front side portion serves as a fulcrum point, a pop up movement in which the front side portion and the rear side portion of the movable panel 12 move up together, and a slide movement in the front/rear direction. In an open/close operation of the front portion of the opening portion 11 by the movable panel 12, a so-called outer sliding type is applied, in which the slide movement is performed while the pop up state is kept. On the other hand, the fixed panel 13 is attached to normally close a rear portion of the opening portion 11.

Figure 2:
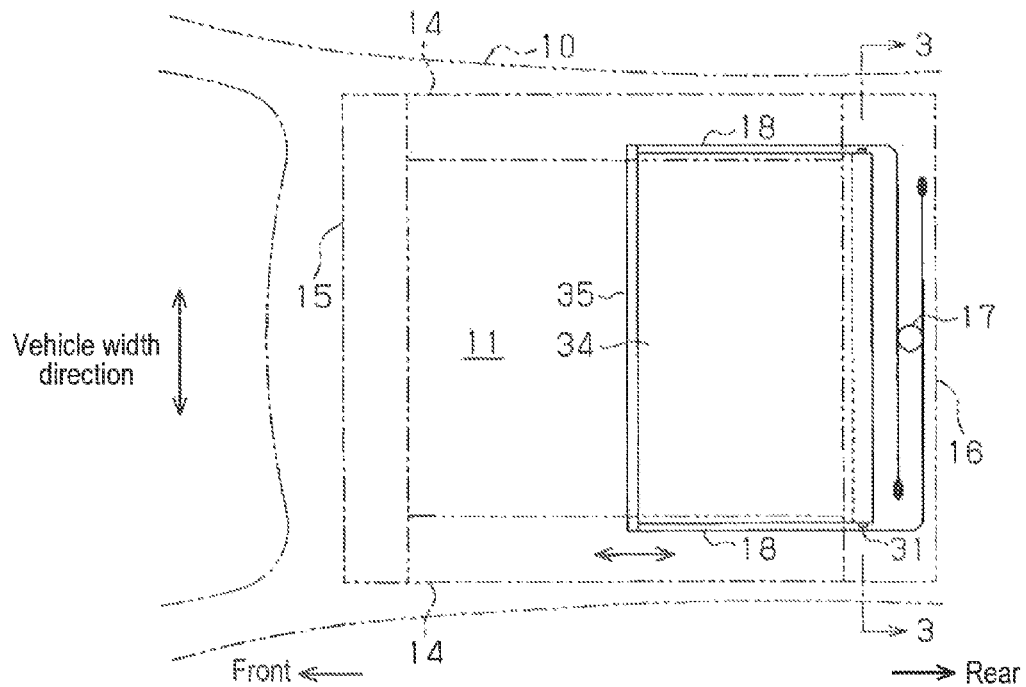

As illustrated in FIG. 2, at the roof portion 10, guide rails 14 made from, for example, extruded material of aluminum alloy are formed at vehicle width direction side edge portions of the opening portions 11 as a pair to extend in the front/rear direction. At the roof portion 10, a front housing 15 made from, for example, resin material and a rear housing 16 serving as a holding member are provided at a front side edge portion and a rear side edge portion of the opening portion 11, respectively. Each of the front housing 15 and the rear housing 16 are provided to extend in the vehicle width direction. A front end and a rear end of each of the guide rails 14 are connected to the front housing 15 and the rear housing 16, respectively. A winding shaft 31 which serves as a winding member extending in the vehicle width direction and includes a substantially circular cylindrical shape is supported at the rear housing 16 to be rotatable about an axis line extending in the vehicle width direction.

Figure 3:
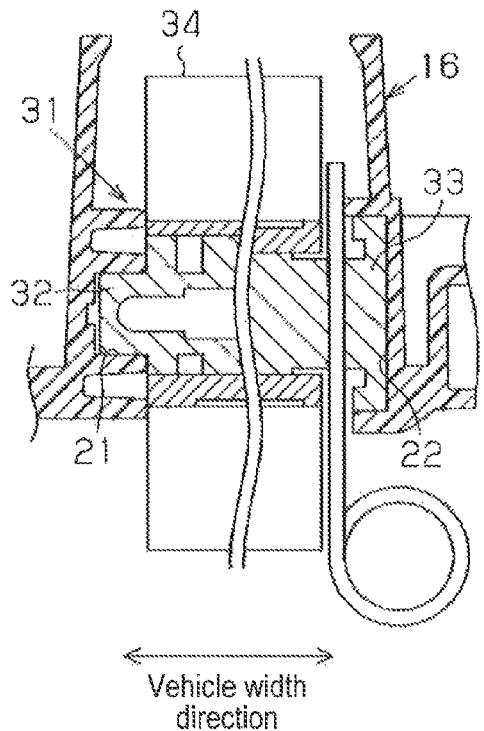

That is, as illustrated in FIG. 3, holding protrusions 32, 33 each formed in a substantially columnar shape are protrudingly provided at both end portions of the winding shaft 31 in the vehicle width direction. On the other hand, a pair of holding recessed portions 21, 22 each formed in a substantially cylindrical shape including a closed end is formed at the rear housing 16 in such a manner that the holding recessed portions 21, 22 open towards the sides that oppose each other in the vehicle width direction. The holding protrusions 32, 33 are fitted by insertion in the holding recessed portions 21, 22, respectively. Thus, the winding shaft 31 is held at the rear housing 16.

As illustrated in FIG. 2, one edge portion (a first edge portion) of a light shielding sheet 34 is fixed to an outer peripheral portion of the winding shaft 31 over an entire length thereof in the vehicle width direction. The winding shaft 31 can wind up and wind out the light shielding sheet 34 as the winding shall 31 rotates. That is, the one edge portion (the first edge portion) of the light shielding sheet 34 in an operation direction in which the light shielding sheet 34 is wound up and wound out (which substantially coincides with the front/rear direction) is fixed to the winding shaft 31. The light shielding sheet 34 is wound up to and wound out from an upper side of the winding shaft 31. The winding shaft 31 includes therein a biasing member (for example, a torsion spring, not shown) for always biasing the winding shaft 31 in a direction in which the winding shaft 31 winds up the light shielding sheet 34.

The other edge portion (a second edge portion) of the light shielding sheet 34 in the operation direction thereof is fixed to a garnish 35 formed in a rod shape extending in the vehicle width direction. Both end portions of the garnish 35 in the vehicle width direction are slidably supported by the both guide rails 14, respectively.

In a case where the light shielding sheet 34 moves in the vehicle front direction along the both guide rails 14 together with the garnish 35, the light shielding sheet 34 is wound out from the winding shaft 31 while rotating the winding shaft 31 in one direction, and passage of the light at, for example, the movable panel 12 is blocked. Alternatively, in a case where the light shielding sheet 34 moves in the vehicle rear direction along the both guide rails 14 together with the garnish 35, the light shielding sheet 34 is wound up by the winding shaft 31 while rotating the winding shaft 31 in the opposite direction, and the passage of the light at, for example, the movable panel 12 is allowed. When the garnish 35 moves in the front/rear direction, both edge portions of the light shielding sheet 34 in the vehicle width direction are slidably supported by the both guide rails 14 within the guide rails 14.

At an intermediate portion of the rear housing 16 in a long-side direction thereof, an electric drive source 17 such as an electric motor including an output gear, for example, is provided. The electric drive source 17 is connected to the both end portions of the garnish 35 via a pair of drive belts 18 each made from, for example, resin material and formed in a substantially band shape, and drives the garnish 35 so that the garnish 35 moves in the front/rear direction. That is, the drive belts 18 that are related to the driving of the garnish 35 extend in the vehicle rear direction from a connection portion where the drive belts 18 are connected to the garnish 35.

Figure 4:
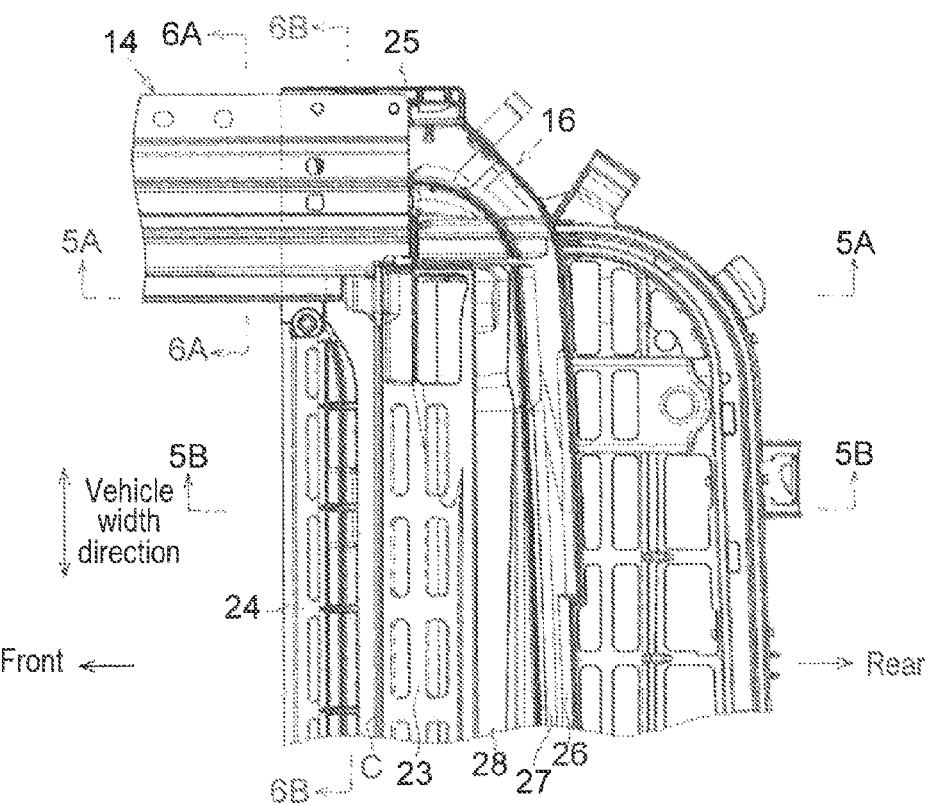
FIG. 4 Plan view illustrating the roll shade apparatus for the vehicle of FIG. 2
Figure 5A:
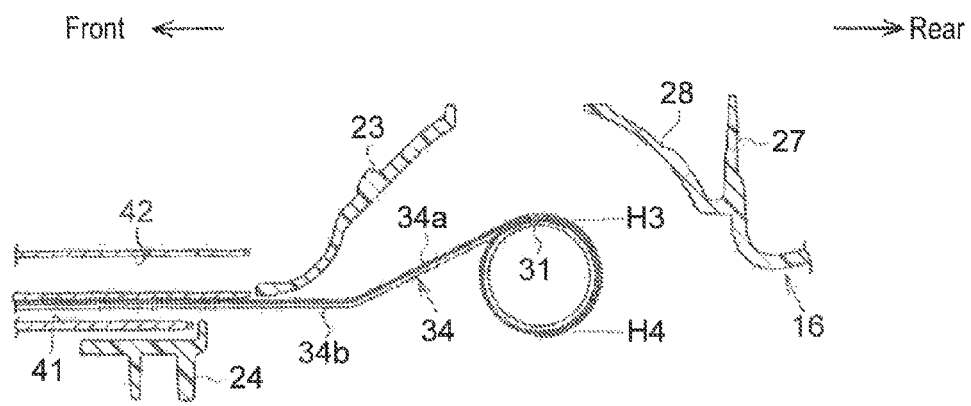
FIG. 5A Cross-sectional view taken along line 5A-5A of FIG. 4
Figure 5B:
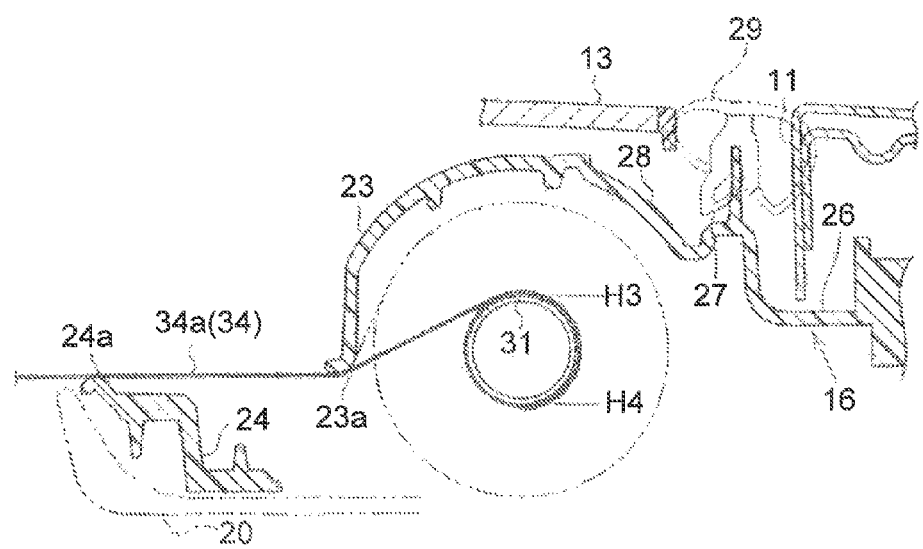
FIG. 5B Cross-sectional view taken along line 5B-5B of FIG. 4

As illustrated in FIGS. 4, 5A and 5B, the rear housing 16 includes a cover portion 23 formed in a substantially circular arc groove shape protruding upwardly and a guide frame 24 formed in a substantially rod shape. The cover portion 23 extends in the vehicle width direction. The guide frame 24 is arranged between the cover portion 23 and a sliding portion 41, which will be described below, in the front/rear direction. The guide frame 24 is arranged to extend in the vehicle width direction while a clearance C is provided at a vehicle front side relative to the cover portion 23. A lower portion of a front end edge of the cover portion 23 forms a first contact portion 23a of which a cross section is substantially circular-arc that protrudes obliquely downwardly in the vehicle rear direction. An upper portion of a front end edge of the guide frame 24 forms a second contact portion 24a of which a cross section is substantially circular-arc that protrudes upwardly. The first contact portion 23a and the second contact portion 24a are arranged at positions that are equivalent to each other in an up/down direction. The sliding portion 41, and the first and second contact portions 23a, 24a are arranged at positions that are equivalent to one another in the up/down direction. The winding shaft 31 is arranged in such a manner that each of the first and second contact portions 23a, 24a is in contact with the light shielding sheet 34 at an intermediate position between an upper-most position H3 of the winding shaft 31 and a lower-most position H4 of the winding shaft 31 in the vehicle height direction (that is, at a position which is lower than the upper-most position H3 and is higher than the lower-most position H4). In addition, the rear housing 16 includes a pair of connecting portions 25 which respectively bridge between the cover portion 23 and the guide frame 24 in the front/rear direction at both ends in the vehicle width direction. The connecting portions 25 are arranged at vehicle outer sides than the light shielding sheet 34.

As illustrated in FIG. 5B, the winding shaft 31 is held by the rear housing 16 (the holding recessed portions 21, 22) at a lower side relative to the cover portion 23. At the light shielding sheet 34 wound up and wound out relative to the winding shaft 31 from the upper side of the winding shaft 31, an upper surface (a reverse surface) of the light shielding sheet 34 is in contact with the first contact portion 23a and a lower surface (a design surface) of the light shielding sheet 34 is in contact with the second contact portion 24a throughout a substantially entire range, in the vehicle width direction, which is disposed between the both guide rails 14. As illustrated in FIG. 5A, each of the edge portions of the light shielding sheet 34 in the vehicle width direction is introduced into the guide rail 14 while being sandwiched between the cover portion 23 and the guide frame 24 in the up/down direction, and slides within the guide rail 14.

Figure 6A:
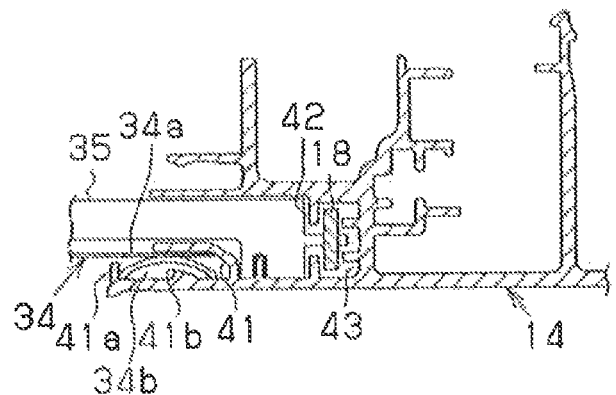
FIG. 6A Cross-sectional view taken along line 6A-6A of FIG. 4
Figure 6B:
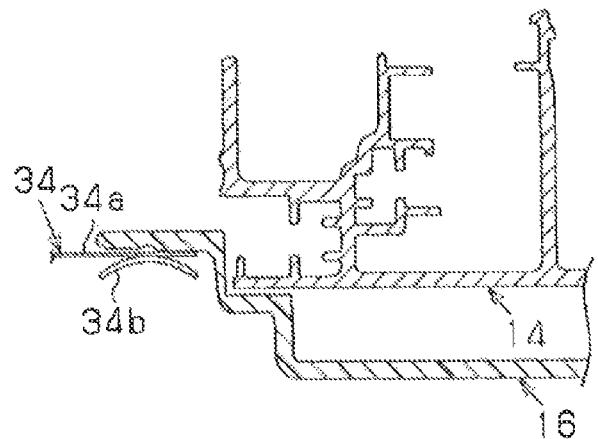
FIG. 6B Cross-sectional view taken along line 6B-6B of FIG. 4
Figure 6B:
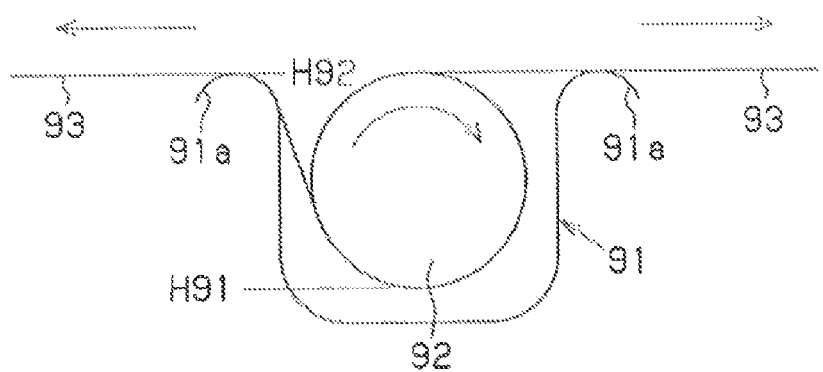

That is, as illustrated in FIG. 6A and FIG. 6B, at a vehicle inner side end portion of the guide rail 14, the sliding portion 41 including a cross section substantially formed in a letter of ⊐ opening towards the vehicle inner side is provided. From an inner side end of a bottom wall of the sliding portion 41 in the vehicle width direction, a restriction piece 41a including a flange shape is extended upwardly in a bent and curved manner. Similarly, from the bottom wall of the sliding portion 41, a forming-and-guiding protrusion 41b including a substantially half semi-cylindrical shape protrudes upwardly. The forming-and-guiding protrusion 41b is arranged to be close to the vehicle outer side in a manner that a central portion, in the vehicle width direction, of the bottom wall of the sliding portion 41 corresponds to an apex of the forming-and-guiding protrusion 41b.

On the other hand, the light shielding sheet 34 is provided with a sheet main body 34a made of fabric and a guide belt 34b. The sheet main body 34a can be spread out to block the passage of the light at, for example, the movable panel 12 as the light shielding sheet 34 is wound out. The guide belt 34b is connected to each side edge portion of the sheet main body 34a in the vehicle width direction. Each guide belt 34b is made from, for example, plate material made of resin, and the guide belt 34b is formed to include a cross section of a substantially circular arc shape protruding upwardly and is extended in a moving direction of the light shielding sheet 34 (the front/rear direction). Each guide belt 34b is attached to an edge portion of the sheet main body 34a by, for example, stitching with thread at a vehicle width direction central portion of the guide belt 34b which serves as an apex of the guide belt 34b.

An end of the guide belt 34b at the vehicle inner side is engaged and stopped at the restriction piece 41a of the sliding portion 41, and the guide belt 34b is slidably placed at the sliding portion 41 in such a manner that a lower surface of the guide belt 34b opposes the forming-and-guiding protrusion 41b. The guide belt 34b is in slidably contact with the bottom wall of the sliding portion 41 at both circumferential end portions of a cross section of the guide belt 34b. Thus, the guide belt 34b, which is pulled in the vehicle width direction by a tensile force of the sheet main body 34a, is prevented by the restriction piece 41a from coming off the sliding portion 41 towards the vehicle inner side. In addition, due to interference with the forming-and-guiding protrusion 41b, the cross-sectional shape of the guide belt 34b which has been wound up by the winding shaft 31 together with the sheet main body 34a is facilitated to return to the cross section of the circular arc shape.

As described above, the sliding of each vehicle width direction edge portion of the light shielding sheet 34 is guided within the guide rail 14 (the sliding portion 41). Each of the guide rails 14 includes a guide portion 42 arranged adjacent to the sliding portion 41 at the vehicle outer side relative to the sliding portion 41 and guiding movement of the corresponding vehicle width direction edge portion of the garnish 35 in the front/rear direction. A cross section of each of the guide portions 42 is substantially formed in a letter of ⊐ opening towards the vehicle inner side. In addition, each of the guide rails 14 includes a belt guide portion 43 arranged adjacent to the guide portion 42 at the vehicle outer side relative to the guide portion 42 and guiding movement of the corresponding drive belt 18 in the front/rear direction. A cross section of each of the belt guide portions 43 is substantially formed in a shape of a letter E which is in communication with the guide portion 42.

As illustrated in FIG. 5B, the rear housing 16 includes a drain portion 26 arranged adjacent to the cover portion 23 at the vehicle rear side relative to the cover portion 23 and including a substantially U-shaped groove configuration extending in the vehicle width direction. The rear housing 16 includes a vertical wall portion 27 provided to stand upwardly along a boundary position between the cover portion 23 and the drain portion 26. A rear portion of the cover portion 23 forms a drain portion 28 formed in a substantially V-shaped groove configuration in cooperation with the vertical wall portion 27. The drain portion 26, which is at a rear side, opposes an opening end edge of the opening portion 11 in the up/down direction, and receives water, including, rain dripping from the opening end edge and drains the water to an outside. On the other hand, the drain portion 28, which is at a front side, opposes an edge portion of the fixed panel 13 in the up/down direction, and receives water, including, rain dripping from the edge portion and drains the water to the outside. A weather strip 29 formed to be hollow and to extend in the vehicle width direction is fitted and attached to an upper end portion of the vertical wall portion 27. The weather strip 29 is in contact with each of the opening end edge of the opening portion 11 and the edge portion of the fixed panel 13 in a fluid-tight manner, thereby preventing the water including the rain from entering downwards. That is, the drain portion 26 and the drain portion 28 receive the water entering from a seal portion between the weather strip 29 and the opening end edge of the opening portion 11 and the water entering from a seal portion between the weather strip 29 and the edge portion of the fixed panel 13, respectively.

As described above, the electric drive source 17 is provided at the rear housing 16. That is, an attaching portion (not shown) of the electric drive source 17 is provided at the rear housing 16. In addition, a guide groove (not shown) for guiding the drive belts 18, which are connected to the electric drive source 17 to be driven by the electric drive source 17, to the guide rails 14 (the belt guide portions 43) is formed at the rear housing 16. A ceiling lining 20 is fixed to the guide frame 24.

Next, operation of the present embodiment will be described. The upper surface of the light shielding sheet 34 (the sheet main body 34a) wound up to and wound out by the winding shaft 31 is in contact with the first contact portion 23a. The lower surface of the light shielding sheet 34 (the sheet main body 34a) is in contact with the second contact portion 24a. The both edge portions, in the vehicle width direction, of the light shielding sheet 34 are guided to the both sliding portions 41, respectively. Accordingly, the upper surface and the lower surface of the light shielding sheet 34 (the sheet main body 34a) are in contact with the first contact portion 23a and the second contact portion 24a, respectively at the positions that are equivalent to each other in the up/down direction. Thus, tension of the light shielding sheet 34 is increased between the first and second contact portions 23a and 24a in the operation direction of the light shielding sheet 34, and thus slack of the light shielding sheet 34 in the downward direction is prevented from occurring. Consequently, the light shielding sheet 34 can form substantially flat surface in an immediate vicinity of each of the sliding portions 41, and wrinkling and/or flapping can be prevented from occurring at the light shielding sheet 34 of which the vehicle width direction edge portions have entered the both sliding portions 41, that is, at the light shielding sheet 34 that has entered below the movable panel 12, for example.

As described above, according to the present embodiment, the following advantages are obtained. (1) In the present embodiment, the wrinkle and/or flapping can be restricted from occurring at the light shielding sheet 34 whose edge portions in the vehicle width direction have entered the both sliding portions 41, that is, at the light shielding sheet 34 that has entered below, for example, the movable panel 12. An aesthetic quality of the light shielding sheet 34 inside the vehicle cabin can be enhanced. In addition, the winding shaft 31 is arranged in such a manner that each of the first and second contact portions 23a, 24a is in contact with the light shielding sheet 34 at the intermediate position between the upper-most position H3 and the lower-most position H4 of the winding shaft 31 in the vehicle height direction. Consequently, compared to a case where the winding shaft 31 is arranged to be displaced significantly in the vehicle height direction relative to, for example, the both sliding portions 41, the entire apparatus can be more downsized in the vehicle height direction.

(2) In the present embodiment, the first and second contact portions 23a, 24a are provided at the rear housing 16 to be integral with the rear housing 16. Consequently, the number of components can be reduced. In addition, at the vehicle outer side relative to the light shielding sheet 34, each of the connecting portions 25 bridges between the first contact portion 23a and the second contact portion 24a (the cover portion 23 and the guide frame 24) in the operation direction. Consequently, the rear housing 16 and the light shielding sheet 34 can be prevented from interfering with each other.

(3) In the present embodiment, the rear housing 16 is connected to the both sliding portions 41 (the guide rails 14) at both end portions, in the vehicle width direction, of the rear housing 16, respectively. Consequently, variations in the positions of the rear housing 16 and the sliding portions 41 can be reduced.

(4) In the present embodiment, the holding recessed portions 21, 22 in which the both vehicle width direction end portions of the winding shaft 31 (the holding protrusions 32, 33) are fitted by insertion are formed at the rear housing 16. Consequently, variations in the positions of the rear housing 16 and the winding shaft 31 can be reduced.

(5) In the present embodiment, the second contact portion 24a (the guide frame 24) is commonly used also as an attaching portion of the ceiling lining 20. That is, the ceiling lining 20 is attached to the second contact portion 24a of the rear housing 16 (the first and second contact portions 23a, 24a) controlling a posture of the light shielding sheet 34. Consequently, variations in the positions of the light shielding sheet 34 serving as interior material and the ceiling lining 20 can be reduced. The aesthetic quality inside the vehicle cabin can be enhanced.

(6) In the present embodiment, the holding protrusions 32, 33 which are related to the holding of the winding shaft 31 are provided at the rear housing 16 to be integral with the rear housing 16. Consequently, compared to a case where, for example, an appropriate bracket holds the winding shaft 31, the number of components can be reduced.

(7) In the present embodiment, the attaching portion of the electric drive source 17 and the guide groove for the drive belts 18 are formed at the rear housing 16. Consequently, the number of components can be reduced. In addition, the rear housing 16 can be commonly used also in a roll shade apparatus of which the light shielding sheet 34 is expanded/retracted manually.

(8) In the present embodiment, by utilizing the rear housing 16 (the first and second contact portions 23a, 24a), which is a single component, the wrinkle and/or flapping of the light shielding sheet 34 (the sheet main body 34a) can be restricted from occurring at low cost and light weight.

(9) In the present embodiment, by utilizing the rear housing 16, which is the single component, the holding of the winding shaft 31, the attachment of the ceiling lining 20, the attachment of the electric drive source 17, the guiding of the drive belts 18, and the drainage of the water entering from the sealing portions of the weather strip 29 can be performed, for example.

The aforementioned embodiment may be modified as follows. In the aforementioned embodiment, the first contact portion 23a may be positioned to be lower than the second contact portion 24a. Also in this case, the light shielding sheet 34 is in contact with the first and second contact portions 23a, 24a at the positions that are displaced from each other in the vehicle height direction in a staggered manner. Consequently, the tension of the light shielding sheet 34 is strengthened between the first and second contact portions 23a and 24a in the operation direction of the light shielding sheet 34.

In the aforementioned embodiment, the winding shaft 31 may be held by a separate member (a bracket, for example) which is separated and independent from the rear housing 16. In the aforementioned embodiment, the rear housing 16 may be arranged at the roof portion 10 so as not to be connected to the both guide rails 14.

In the aforementioned embodiment, the first and second contact portions 23a, 24a may be provided at respective members which are dependent from each other. In the aforementioned embodiment, the ceiling lining 20 may be attached to a separate member which is independent from the rear housing 16.

In the aforementioned embodiment, the electric drive source 17 and the garnish 35 may be connected to each other with the use of a cable instead of the drive belts 18. In the aforementioned embodiment, for example, the winding out of the light shielding sheet 34 from the winding shaft 31 may be performed manually.

In the aforementioned embodiment, the winding shaft 31 may be held at a front edge portion of the opening portion 11

(the front housing 15, for example) and the light shielding sheet 34 may be wound out in the vehicle rear direction. The movable panel 12 and the fixed panel 13, which are provided at the opening portion 11 of the roof portion 10, serve as the light transmission portion in the aforementioned embodiment. In this case, a fixed panel normally closing the front portion of the opening portion 11 may be applied instead of the movable panel 12.

In the aforementioned embodiment, die panel serving as the light transmission portion and closing the opening portion 11 may be one, or may be three or more. In addition, each of the panels may be a movable panel and/or a fixed panel.

Further, in a case where the entire roof portion is constituted by the resin material, part of the roof portion may serve as the light transmission portion.

The invention claimed is:

1. A roll shade apparatus for a vehicle, comprising:
    a light shielding sheet;
    a winding member to which a first edge portion of the light shielding sheet in an operation direction thereof is fixed, the winding member being capable of winding up and winding out the light shielding sheet to allow and block passage of light at a light transmission portion provided at a roof portion of a vehicle;
    a garnish with which a second edge portion of the light shielding sheet in the operation direction thereof is provided;
    a pair of sliding portions each provided at the roof portion to extend in the operation direction, the sliding portions guiding both vehicle width direction edge portions of the light shielding sheet in the operation direction;
    a first contact portion arranged between the both sliding portions and the winding member in the operation direction, the first contact portion being in contact with an upper surface of the light shielding sheet wound up and wound out by the winding member at a first intermediate position between an upper-most position of the winding member and a lower-most position of the winding member in a vehicle height direction; and
    a second contact portion arranged between the both sliding portions and the first contact portion in the operation direction, the second contact portion being in contact with a lower surface of the light shielding sheet at a second intermediate position between the upper-most position of the winding member and the lower-most position of the winding member in the vehicle height direction, the second contact portion guiding the both vehicle width direction edge portions of the light shielding sheet to the both sliding portions, respectively, the second intermediate position being positioned equivalent to the first contact portion in the vehicle height direction, wherein
    the first contact portion and the second contact portion are provided at a single holding member to be integral with the holding member,
    the holding member includes a pair of connecting portions bridging between the first contact portion and the second contact portion in the operation direction at outer sides relative to the light shielding sheet in the vehicle width direction, respectively, and
    the light shielding sheet is configured to linearly elongate between the first contact portion and a position beyond the second contact portion in the operation direction as viewed in the vehicle width direction when the light shielding sheet is wound out so that the garnish is at the position beyond the second contact portion.

2. The roll shade apparatus for the vehicle according to claim 1, wherein each end portion of the holding member in the vehicle width direction is connected to the corresponding sliding portion.

3. The roll shade apparatus for the vehicle according to claim 1, wherein the holding member is provided with holding recessed portions in which both vehicle width direction end portions of the winding member are fitted by insertion.

4. The roll shade apparatus for the vehicle according to claim 1, wherein the second contact portion is used also as an attaching portion of a ceiling lining.

5. The roll shade apparatus for the vehicle according to claim 1, wherein the operation direction substantially coincides with a vehicle front/rear direction.

* * * * *